United States Patent
Park

(10) Patent No.: US 7,508,981 B2
(45) Date of Patent: Mar. 24, 2009

(54) DUAL LAYER BUS ARCHITECTURE FOR SYSTEM-ON-A-CHIP

(75) Inventor: Hyun-Sang Park, Cheonan-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 713 days.

(21) Appl. No.: 11/200,039

(22) Filed: Aug. 10, 2005

(65) Prior Publication Data
US 2006/0129727 A1 Jun. 15, 2006

(30) Foreign Application Priority Data
Dec. 15, 2004 (KR) ............... 10-2004-0106041

(51) Int. Cl.
*G06K 9/00* (2006.01)
*G06F 13/00* (2006.01)
*G06F 13/14* (2006.01)

(52) U.S. Cl. .................. 382/166; 710/107
(58) Field of Classification Search ........... 382/162, 382/164, 166, 236, 305; 710/1, 20, 27, 100, 710/107, 260–263, 300, 305, 306, 315; 725/37, 725/86; 703/17
See application file for complete search history.

(56) References Cited
U.S. PATENT DOCUMENTS

| | | | | |
|---|---|---|---|---|
| 5,684,997 A * | 11/1997 | Kau et al. | .................. | 710/260 |
| 5,713,006 A * | 1/1998 | Shigeeda | .................. | 711/170 |
| 5,784,592 A | 7/1998 | Gulick et al. | | |
| 5,822,550 A * | 10/1998 | Milhaupt et al. | .................. | 710/315 |
| 5,875,312 A * | 2/1999 | Walsh et al. | .................. | 710/303 |
| 6,006,300 A * | 12/1999 | Toutant | .................. | 710/314 |
| 6,654,919 B1 * | 11/2003 | Watkins | .................. | 714/733 |
| 7,340,548 B2 * | 3/2008 | Love | .................. | 710/305 |
| 2003/0037335 A1 * | 2/2003 | Gatto et al. | .................. | 725/86 |
| 2006/0129727 A1 * | 6/2006 | Park | .................. | 710/107 |

* cited by examiner

*Primary Examiner*—Amir Alavi
(74) *Attorney, Agent, or Firm*—Volentine & Whitt, PLLC

(57) ABSTRACT

A dual layer bus architecture for a system-on-a-chip (SOC) is disclosed. The bus architecture comprises a main bus adapted to connect a microprocessor, an image capture module, and a dual master module to a high density memory and a secondary memory operating independently of the main bus and adapted to connect the dual master module to a high-speed secondary memory.

11 Claims, 11 Drawing Sheets

DUAL LAYER BUS ARCHITECTURE FOR SYSTEM-ON-A-CHIP

BACKGROUND OF THE INVENTION

1. Field of the Invention

The invention relates generally to a bus architecture for a system-on-a-chip (SOC). More particularly, the invention relates to a dual layer SOC bus architecture adapted for use in high-performance multimedia processing applications.

2. Description of the Related Art

Modern electronic devices increasingly provide users with various multimedia processing capabilities. For example, portable electronic devices such as cellular phones and personal digital assistants (PDAs) allow users to capture, download, display, or otherwise process various forms of multimedia information such as audio and video. As the use of multimedia-enabled devices becomes increasingly widespread, the demand for smaller, faster devices continues to grow. Accordingly, improved designs for multimedia-enabled devices are constantly in demand.

One approach to the design and manufacture of small, high performance electronic devices involves placing all of the necessary system elements within a single integrated circuit (IC). Such an arrangement or implementation of elements is commonly referred to as a system-on-a chip (SOC). For example, a SOC for an audio processing application may combine an audio receiver, an analog to digital converter (ADC), a microprocessor, a memory, and input/output logic, on a single IC chip.

One problem associated with conventional SOC architectures is that they are not well adapted to processing data in several commonly used multimedia formats. For example, conventional SOC architectures typically provide sluggish performance and consume excessive power when coding (i.e., encoding and decoding) data in any one of the various Moving Picture Experts Group (MPEG) formats. This is due, at least in part, to the fact that the conventional SOC architectures are easily overwhelmed by the large amount of data that is read from and written to memory during coding procedures. In order to overcome this problem, improved bus architectures designed to accommodate the expanded bandwidth (i.e. data carrying capacity) requirements of multimedia processing applications are needed.

To better understand the bandwidth requirements for multimedia processing applications, a brief overview of MPEG encoding and decoding will be provided. MPEG is just a selected example. Any one of a number of coding examples might be alternatively presented, but MPEG is a widely understood standard and provides an excellent teaching predicate for the discussion of the invention that follows.

In general, the term "encoding" refers to a process of converting raw, unstructured input data into a structured, or coded format. For example, in the case of MPEG encoding, this process comprises transforming a sequence of input video frames into a sequence of coded, or compressed data frames. The device used to carry out the process of encoding is generically referred to as an encoder. Many different encoder designs are conventionally available to perform MPEG encoding.

The term "decoding" refers to a process of reconstructing the original input data from coded data. For example, in the case of MPEG decoding, the process comprises reconstructing the input video frames based on the coded frames. In most cases, the reconstructed input video frames are not identical to the original input video frames due to information lost during the encoding/decoding process. In such cases, the reconstructed input video frames are approximations of the corresponding originals. The device used to carry out the process of decoding is generically referred to as a decoder. Many different decoder designs are conventionally available to perform MPEG decoding.

The input video frames used in MPEG encoding are typically composed of a collection of pixel values arranged in a row-column format. In most cases, each pixel comprises values for more than one information channel. For example, a pixel may comprise values for red, green, and blue (RGB) color channels. In other cases, the RGB color channels are equivalently expressed as luminance (Y) and chrominance (UV) components. The chrominance values are typically subsampled relative to the luminance values for purposes of bit reduction. For example, four blocks of luminance values may be combined with two equivalently sized blocks of chrominance values to form a single larger block called a "macroblock". In general, a macroblock may comprise any number of chrominance or luminance blocks of any size. However, for illustrative purposes it will be assumed that a macroblock comprises four 8×8 luminance blocks arranged in a square, and an 8×8 red chrominance block and an 8×8 blue chrominance block subsampled at the middle of the four 8×8 luminance blocks.

MPEG encoding is performed by first dividing the input video frames into three different types: I-frames, P-frames, and B-frames. I-frames are termed intra-coded frames because they are encoded without reference to other frames. P-frames and B-frames are termed inter-coded frames because they are encoded using information from other frames. More specifically, each P-frame is predicted based on a previous I-frame or P-frame, and each B-frame is predicted based on a previous and a next I-frame or P-frame.

Each I-frame in an input video sequence is encoded as a set of quantized discrete cosine transform (DCT) coefficients, while each P-frame and B-frame, on the other hand, is encoded as a set of motion vectors and a corresponding prediction error frame. The process of encoding the I-frames, P-frames, and B-frames will now be explained.

Each input video frame in an input video sequence is designated a-priori as an I-frame, a P-frame, or a B-frame. One way to make this designation is to define a repeating sequence of frame types and to perform coding on the input video frames according to the repeating sequence. For example, suppose that the sequence is defined as $I_1, B_2, B_3, B_4, P_5, B_6, B_7, B_8, P_9$, where "$I_1$" denotes that the first frame in the sequence is an I-frame, "$B_2$" denotes that the second frame in the sequence is a B-frame, and so forth. Accordingly, the first frame in the sequence of input video frames is designated as an I-frame, the second frame a B-frame, and so forth.

Since each P-frame in the sequence is coded with respect to the previous I-frame or P-frame, and each B-frame in the sequence is coded with respect to the previous and next I-frame or P-frame, the input video frames are generally encoded out of order. For example, the frames in the above sequence may be encoded in the order, $I_1, P_5, B_2, B_3, B_4, P_9, B_6, B_7, B_8$ so that frames $B_2, B_3,$ and $B_4$ have access to both of frames $I_1$ and $P_5$, as needed for their encoding, and so that frames $B_6, B_7,$ and $B_8$ have access to frames $P_5$ and $P_9$. In sum, the input video frames are first designated as I-frames, B-frames, and P-frames and then reordered according to a corresponding predetermined sequence before encoding takes place. The coded frames are typically restored to their original order after they have been decoded.

An I-frame is encoded using intra-frame DCT coding. Intra-frame DCT coding begins by dividing a frame into small blocks. Typically, each small block comprises an 8×8 block of 8-bit pixel values. Each small block is transformed into a DCT coefficient block using a discrete cosine transform. The DCT coefficient block typically holds the same number of values as the small block, but usually more bits are used to store each value. For example, an 8 pixel by 8 pixel block of 8-bit values may be transformed into an 8×8 DCT coefficient block of 11-bit values. Where a frame comprises pixel values for multiple information channels, small blocks for each channel are typically DCT coded separately.

Following intra-frame DCT coding, values stored in each DCT coefficient block are quantized by dividing the values by some amount (usually a multiple of 2) and truncating the result. This usually results in a loss of some information contained in the original I-frame, however, measures are taken to ensure that the loss of information does not significantly impair the resulting image quality for the I-frame. For example, DCT coefficients corresponding to higher frequency image components are typically quantized to a greater degree than those corresponding to lower frequency image components because the human eye is less sensitive to detail near the edges of objects than other portions of an image.

Finally, after undergoing quantization, each DCT coefficient block is serialized and encoded using variable length coding (VLC). Serialization is performed by reading the values in the DCT coefficient block in a series using a zigzag pattern starting with the direct current (DC) component and continuing from coefficients representing low-frequency image components to coefficients representing higher-frequency image components. For example, coefficients in the matrix $$\begin{matrix} 1 & 2 & 3 \\ 4 & 5 & 6 \\ 7 & 8 & 9 \end{matrix}$$

would typically be read out in the order 1, 2, 4, 7, 5, 3, 6, 8, 9.

Variable length coding is performed by grouping together runs of zeros followed by a non-zero value. For example, suppose that the following series is read from the DCT coefficient block using the zigzag pattern: 3, 1, 0, 0, 5, 2, 0, 0, 0. The values are arranged into groups as follows: (3), (1), (0, 0, 5), (2), EOB, where the label EOB stands for "end of block", and it indicates that the remaining entries in the sequence are all zero.

Once the values are arranged into groups, each group is then substituted with a unique code word from a VLC look-up table. The VLC look-up table has the property that no code word in the table is a prefix for any other code word in the table. Hence, a series of code words generated according to the VLC look-up table can be arranged as a bitstream while still allowing a decoder to determine the beginning (start) and end (finish) of each code word within the bitstream. To illustrate the conversion of the above series into a bitstream, the following look-up table will be used as a simple example. Let the group "(3)" be represented by the code word "000", let the group "(1)" be represented by the code word "111", let the group "(0, 0, 5)" be represented by the code word "101", let the group "(2)" be represented by the code word "110", and let the label EOB be represented by the code word "01". Accordingly, the values in the series can coded by the bitstream "00011110111001".

A P-frame is encoded by performing motion estimation on the frame relative to a reference frame in order to generate a set of motion vectors. For P-frames, the reference frame is the previous I-frame or P-frame in the input video sequence and each motion vector denotes estimated motion of a macroblock between the reference frame and the P-frame. For example, a motion vector defines a relative shift between a macroblock in the P-frame and the "best match" for the block in the reference frame.

The motion vectors are applied to the reference frame to generate a frame "V", which is an approximation of the P-frame. The motion vectors are applied to the reference frame by shifting each macroblock in the reference frame by an amount indicated by one of the motion vectors. Frame "V" is then subtracted from the P-frame to generate a prediction error frame "E", and frame "E" is stored along with the motion vectors in order to eventually reconstruct the P-frame.

In reconstructing a frame based on the motion vectors and frame "E", the motion vectors are added to the reference frame to generate frame "V" and then frame "E" is added to frame "V" to generate an approximation of the original P-frame. Because frame "E" is used to compensate for error in frame "V", frame "E" is often referred to as "motion compensation error". Accordingly, encoding techniques that rely on generating motion vectors and motion compensation error as described above are often referred to as "motion compensated inter-frame coding".

Frame "E" is generally encoded using intra-frame DCT coding, quantization, and VLC. This tends to significantly reduce the number of bits needed to represent frame "E", especially in cases where frame "V" is very similar to the P-frame, i.e., where the prediction error is small. In these cases, the quantized DCT coefficient blocks corresponding to frame "E" tend to contain large numbers of zeros. As a result, VLC will generally achieve efficient compression for the DCT coefficient blocks.

A B-frame is encoded in a manner very similar to a P-frame. However, motion estimation for a B-frame is performed relative to two reference frames instead of one. The reference frames are the previous and next I-frame or P-frame in the input video sequence and the motion estimation generates motion vectors which are typically averages based on motion estimation performed relative to the two reference frames.

It should be particularly noted that the motion estimation is generally not performed on the original input video frames, but instead it is performed using previously encoded and decoded I-frames, P-frames, and B-frames. In other words, before motion estimation is performed, the input video frames are pre-processed by intra-frame DCT coding and quantization, followed by inverse quantization and inverse DCT coding. This is done so that the frame estimation based on the motion vectors can be repeated in a decoder. Since intra-frame DCT coding and quantization cause the input video frames to lose information, performing motion estimation on the input video frames would lead to unpredictable results in the decoding process. Since MPEG encoding requires motion estimation to be performed on previously encoded/decoded frames, most MPEG encoders include a local decoder used to produce these frames.

It should also be noted that where the motion compensation error for a particular macroblock in a P-frame or B-frame is extremely large, intra-frame DCT coding may be used to encode the macroblock instead of motion compensated inter-frame coding. This prevents drastic changes in the input video sequence from causing poor encoding of the sequence.

The result of MPEG encoding is a compressed bitstream (i.e., compressed image data) that can either be stored in memory or transmitted to a decoder. The bitstream generally includes any VLC coded DCT coefficients and motion vectors corresponding to each frame as well as some additional information used for decoding the frames. The additional information typically includes the type of each frame, the quantization values used for the DCT coefficients, and so forth.

The decoding procedures used for each of the different frame types are generally inverses of the procedures used to encode the frames. For example, an I-frame is decoded by decoding the VLC encoded DCT coefficients using the look-up table, multiplying the resulting DCT coefficients by the quantization values, and then inverse DCT transforming the DCT coefficients to yield a set of pixel values for an output video frame.

Similar inverse procedures are performed on P-frames and B-frames to produce output video frames corresponding to the input video frames. In addition, the P-frames and B-frames are decoded using the motion vectors and the motion compensated error as described above.

Once the decoding procedure is completed, the output video frames are reordered into their original order based on the input video frames.

For simplicity of explanation, several details have been omitted from the explanation of MPEG encoding and decoding. In addition, specific details of various MPEG standards, including MPEG-1, MPEG-2, MPEG-4, and MPEG-7 were also omitted. However, MPEG encoding and decoding are well known procedures and hence the omitted details are available from other sources.

Real-time MPEG encoding and decoding generally requires at least enough bandwidth to achieve a frame rate of several frames per second. Accordingly, each of the several frames is read from an input device and written to memory. Then, blocks within each frame are successively transferred back and forth between memory and an image compression module used for DCT coding, quantization, motion estimation and so forth. These operations can easily consume the available bandwidth of conventional SOC architectures, which usually rely on slower, high density memories such as dynamic random access memory (DRAM) or Flash. The slower, high density memories are used in the SOC architectures because they are cheaper, they take up less space, and they have larger capacities than faster low density memories such as static random access memory (SRAM).

FIGS. 1 and 2 are block diagrams illustrating conventional SOC architectures. FIG. 1 shows a conventional single layer SOC bus architecture and FIG. 2 shows a conventional multi-layer SOC bus architecture.

In the conventional single layer SOC bus architecture shown in FIG. 1, a plurality of modules 10 through 80 are connected to a single system bus 12. The term "module" is used here to refer to a particular functional entity within an electronic device. For example, a module may be read to encompass a set of software routines, a particular hardware (e.g., circuit) configuration, and/or some combination thereof. The term "module" may also refer to a collection of functional entities, i.e., multiple modules, or even sub-elements within a module.

Referring to FIG. 1, module 10 comprises a reduced instruction set computer (RISC), module 20 comprises a camera interface, module 30 comprises a moving image compression module, module 40 comprises a still image compression module, module 50 comprises a graphics acceleration module, and module 60 comprises a transfer module adapted to transfer image data to a liquid crystal display (LCD) device. Module 70 comprises a memory controller and module 80 comprises a high density (e.g., DRAM) memory.

The SOC bus architecture shown in FIG. 1 is perhaps the most commonly used SOC bus architecture—at least in part because of its low cost and ease of implementation. However, because the bandwidth demands placed upon bus 12 is determined by summing the bandwidth demand for each connected module, the total available bandwidth may be consumed by the needs of only a small number of the connected modules. In particular, the total available system bus bandwidth may easily be consumed (or exceeded) by the bandwidth demands of the moving image compression module and the camera interface when incoming video is being processed.

As between the exemplary elements shown in FIGS. 1 and 2, and generally throughout the description that follows, like reference numerals indicate like or similar elements. Thus, in the multi-layer SOC bus architecture of FIG. 2, module 10 is connected to a first bus 12-1, modules 20, 30, and 40 are connected to a second bus 12-2, and modules 50 and 60 are connected to a third bus 12-3. The first, second, and third buses are respectively connected to three memory controllers 70-1, 70-2, and 70-3, and the three memory controllers are respectively connected to three high density memories 80-1, 80-2, and 80-3.

By using multiple (e.g., three) layers, the SOC bus architecture shown in FIG. 2 provides more available bandwidth than the single system bus architecture shown in FIG. 1. That is, the total available bandwidth for the system shown in FIG. 2 is the sum of the available bandwidth in each bus layer. By providing more bandwidth, the SOC bus architecture of FIG. 2 is able to effectively support real-time multimedia processing. Unfortunately, however, the multi-layer bus system is expensive and difficult to manufacture. As a result, this system type is not well suited to be manufactured of commercial products where low cost and ease of implementation are important. In addition, the performance improvement gained by using the multi-layer bus architecture of FIG. 2 may, nonetheless, be limited by the access speed of high density memory 80-2, for example, which may be insufficient to accommodate the bandwidth requirements of moving image compression module 30.

FIG. 3 is a block diagram showing a conventional bus architecture for a non-SOC computer system. Such a system is disclosed, for example, in U.S. Pat. No. 5,784,592.

Referring to FIG. 3, the PC computer system enables high-performance multimedia processing by placing a multimedia memory 160 between a standard local bus 120 and a real-time multimedia bus 130B. Multimedia memory 160 provides storage for multimedia devices 142B, 144B, and 146B so that they can process multimedia information without having to contend for access to standard local bus 120.

The operation of the multimedia memory and the multimedia devices is controlled by a central processing unit (CPU) 102 through a chipset 106B. The CPU transfers multimedia data from a main memory 110 to the multimedia memory and sends control signals to the multimedia memory and multimedia devices indicating when to start or stop certain multimedia processing functions and when to send data through bus 120.

The computer system shown in FIG. 3 has at least two limitations. One limitation is the need to fetch the multimedia data from the main memory to the multimedia memory. This adds significant overhead to multimedia processing procedures where the procedures perform fetch operations on a frequent basis. The other limitation, which is related to the first, is the size of the multimedia memory. The multimedia memory is designed to store large amounts of data including code and overflow data from the main memory in addition to the multimedia data. Although the large size of the multimedia memory may help reduce the frequency with which multimedia data is fetched from the main memory, it makes it difficult to implement the suggested system architecture in a small area, such as in a SOC.

Due to the at least the above described limitations apparent in conventional systems, an improved SOC bus architecture is needed for multimedia processing applications.

SUMMARY OF THE INVENTION

Recognizing the need for bus architectures supporting improved multimedia performance in SOC based applications, embodiments of the invention provide effective techniques for reducing the amount of main system bus bandwidth consumed by various multimedia processing procedures. In one aspect, the invention provides a secondary bus adapted to connect multimedia processing modules to a secondary memory. Multimedia processing modules operating within the SOC are adapted to "transfer" (e.g., send and/or receive; read and/or write) data to/from a main memory and the secondary memory, thereby dividing their respective bandwidth requirements between two bus structures.

According to one embodiment of the present invention, a SOC bus architecture comprises a main bus adapted to connect a microprocessor, an image capture module, and a dual master module to a high density main memory, and a high-speed secondary bus operating independently from the main bus and adapted to connect the dual master module to a high-speed secondary memory.

According to another embodiment of the invention, a method adapted for use in the SOC bus architecture is provided. The method comprises receiving raster-scan ordered current image data corresponding to a current frame, rearranging the raster-scan ordered current image data into a plurality of macroblocks and storing the plurality of macroblocks in the secondary memory. The method further comprises transferring the plurality of macroblocks from the secondary memory to a moving image data compression module via the secondary bus, transferring previous image data corresponding to a previous frame from the main memory to the moving image data compression module via the main bus, and generating compressed image data from the plurality of macroblocks and the previous image data.

According to still another embodiment of the present invention, another method adapted for use in the SOC bus architecture comprises receiving raster-scan ordered current image data corresponding to a current frame, rearranging the raster-scan ordered current image data into a plurality of macroblocks and storing the plurality of macroblocks in the secondary memory, and transferring previous image data corresponding to a previous frame to the moving image data compression module. The method further comprises transferring the plurality of macroblocks from the secondary memory via the secondary bus to the moving image data compression module, generating compressed image data from the plurality of macroblocks and the previous image data, and transferring the compressed image data to the main memory.

According to still another embodiment of the present invention, a method adapted for use in the SOC bus architecture comprises receiving raster-scan ordered image data from an image capture module, rearranging the raster-scan ordered image data into a plurality of Minimum Coded Units (MCUs), storing the plurality of MCUs in the secondary memory via the secondary bus, generating compressed image data from the plurality of MCUs, and storing the compressed image data in main memory via the main bus.

According to yet another embodiment of the present invention, a method adapted for use in a SOC is provided. The SOC comprises a main bus connecting a main memory with a graphics acceleration module and a moving image data compression module, and a high-speed secondary bus operating independently from the main bus and connecting a high-speed secondary memory with the graphics acceleration module and the moving image data compression module. The method comprises receiving graphics data in the graphics acceleration module from the main memory via the main bus, transferring pattern image data for the graphics data to the graphics acceleration module from the secondary memory via the secondary bus to modify the graphics data, and transferring the modified graphics data to the main memory via the main bus.

According to yet another embodiment of the present invention, a method adapted for use in the SOC bus architecture comprises using the moving image compression module to perform motion estimation using a plurality of macroblocks corresponding to a current frame stored in the secondary memory, and a decoded version of previous image data corresponding to a previous frame and performing motion compensation using the plurality of macroblocks and a decoded version of the previous image data stored in main memory. The method further comprises storing the compressed image data.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF THE EXEMPLARY EMBODIMENTS

Exemplary embodiments of the invention are described below with reference to the corresponding drawings. These embodiments are presented as teaching examples. The actual scope of the invention is defined by the claims that follow.

In general application, embodiments of the invention provide a dual layer bus architecture for a System On a Chip (SOC) adapted to perform multimedia processing. The dual layer bus architecture comprises a main bus and a secondary bus respectively connecting one or more modules adapted for processing multimedia information to a main memory and a secondary memory. Connecting the modules to the two buses improves the multimedia processing capacity of SOC by dividing the modules' bandwidth requirement between the two buses.

Figure 1:
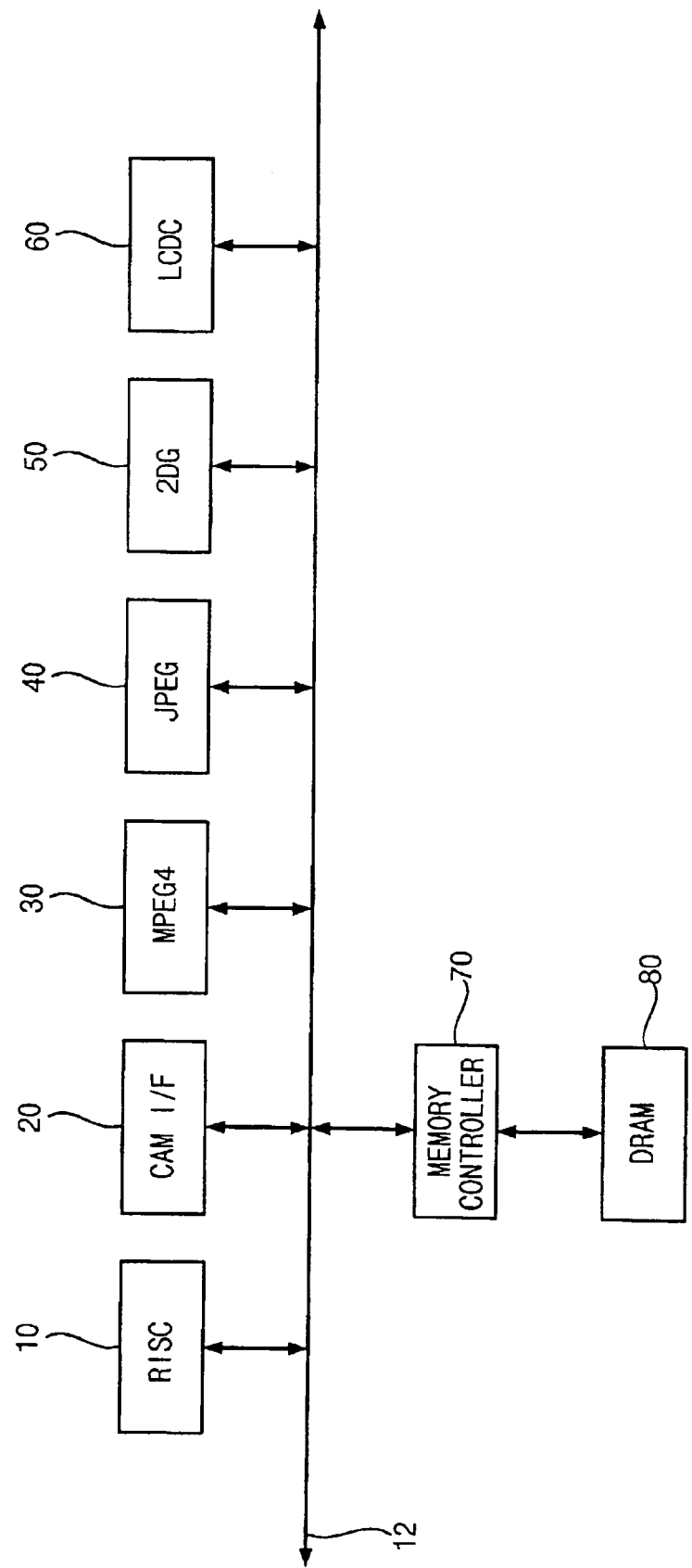
FIG. 1 is a block diagram illustrating a conventional SOC bus architecture.
Figure 2:
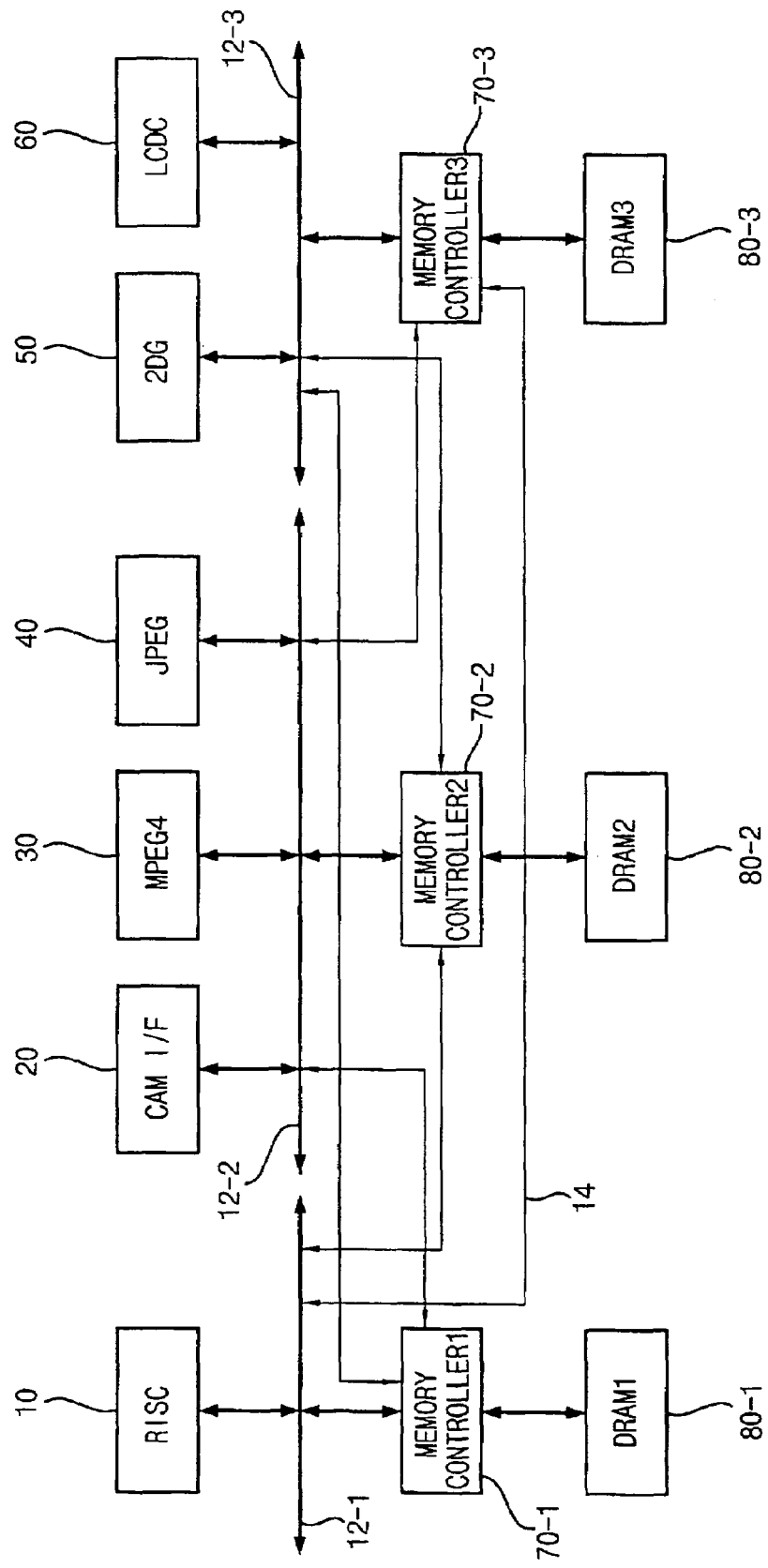
FIG. 2 is a block diagram illustrating a conventional multi-layer SOC bus architecture.
Figure 3:
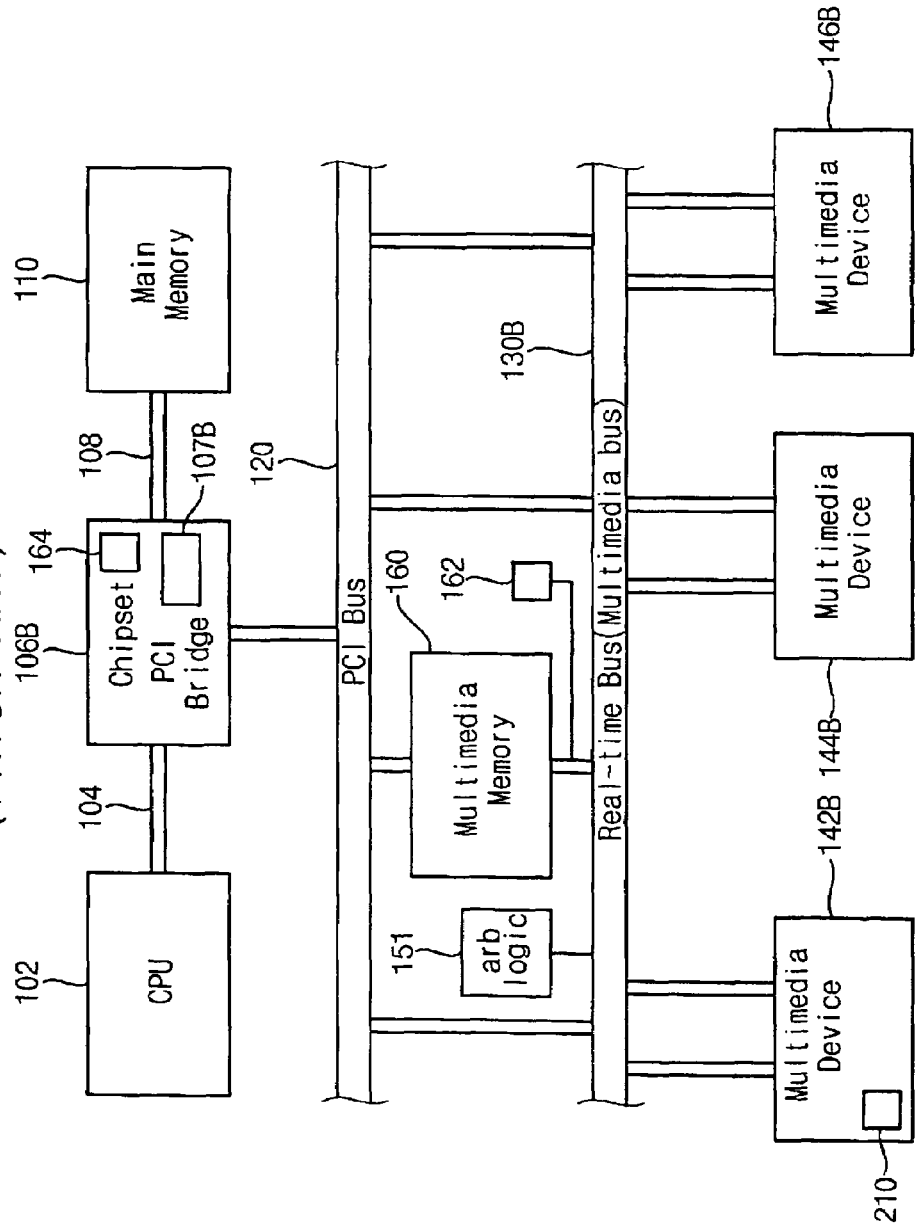
FIG. 3 is a block diagram illustrating a conventional non-SOC bus architecture.
Figure 4:
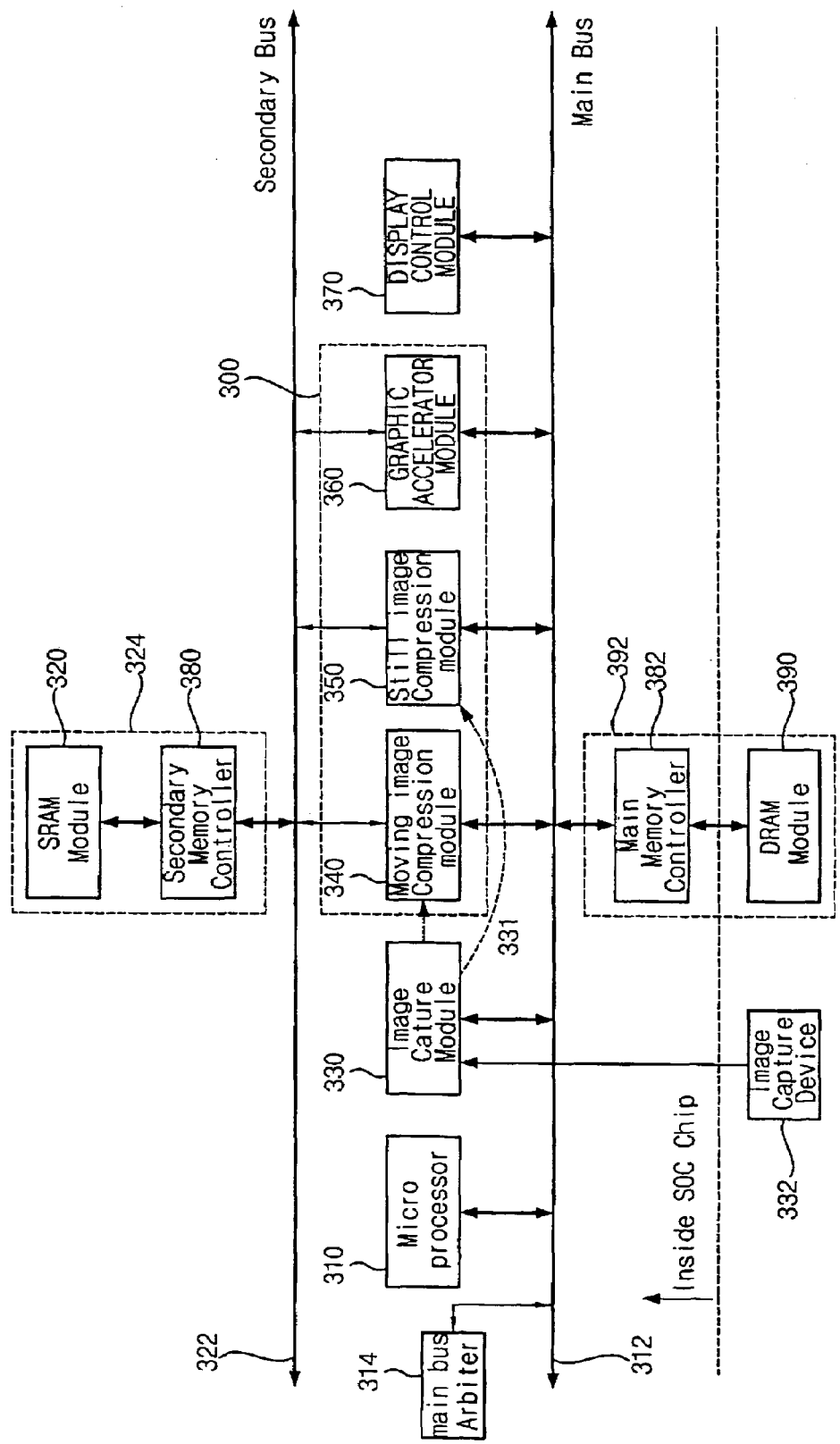
FIG. 4 is a block diagram of a SOC bus architecture according to one embodiment of the present invention.

FIG. 4 is a block diagram of a SOC bus architecture according to one embodiment of the present invention. Referring to FIG. 4, the SOC bus architecture comprises a main bus 312 connecting a microprocessor 310, an image capture module 330, a dual master module 300, and a display control module 370 to a high-density main memory 392. The main memory comprises, for example, a main memory controller 382 controlling at least one dynamic random access memory (DRAM) module 390 located outside of the SOC. Access to main bus 312 is controlled by a main bus arbiter circuit 314.

The SOC bus architecture of FIG. 4 further comprises a high-speed secondary bus 322 operating independently from main bus 312 and connecting dual master module 300 to a high-speed secondary memory 324. Secondary memory 324 comprises, for example, a secondary memory controller 380 controlling at least one static random access memory (SRAM) module 320.

As shown in FIG. 4, dual master module 300 comprises, for example, a moving image compression module 340, a still image compression module 350, and a graphics acceleration module 360, each respectively connected to main bus 312 and the secondary bus.

In one embodiment, moving image compression module 340 is adapted to receive raw image data as a set of red-green-blue (RGB) values or as a set of luminance and chrominance (YCbCr or YUV) values. The raw image data received by the moving image compression module typically corresponds to a sequence of moving images such as a streaming video sequence. The moving image compression module compresses and/or decompresses the image data using some form of coding such as MPEG coding, for example.

Similarly, in one embodiment still image compression module 350 is adapted to receive raw image data as a set of RGB values or YCbCr or YUV values. However, the image data received by the still image module typically corresponds to a single image. The still image compression module compresses and/or decompresses the raw image data using some form of coding such as JPEG coding, for example.

Where moving image compression module 340 is assumed to use MPEG coding, it will include an MPEG coder/decoder (codec). In contemporary systems, the MPEG codec is either MPEG-4 or MPEG-2 compliant. Similarly, where still image compression module 350 is assumed to use JPEG coding, it will include a JPEG codec.

Where present, graphics acceleration module 360 provides additional specialized capabilities to the SOC. For example, graphics acceleration module 360 may perform polygon rendering or texture mapping related to image data to-be subsequently displayed on the system display (not shown).

The raw image data (or more generally any scan-ordered image data) is received by dual master module 300 from image capture module 330 or from main memory 392. The raw image data may be transferred from image capture module 330 to dual master module 300 through secondary bus 322 or through an (optionally provided) image data bus 331 which directly connects image capture module 330 with moving image compression module 340 and/or still image compression module 360.

Image capture module 330 receives data from an image capture device (not shown), typically located outside the SOC. The image capture device may comprise a video camera, a still camera, a touch screen, or any other device transforming one or more input signals into one or more output signals and then communicating the output signals to image capture module 330. For example, the image capture device may transform received image capture signals using some combination of electronic components, optics, capacitative sensors, transducers, electrochemical sensors, infrared detectors, etc. The image capture device may then provide corresponding electrical signals to image capture module 330 in a discretized or digital format.

Image capture module 330 typically comprises a specialized interface circuit adapted to receive electrical signals from a particular type(s) of image capture device. For instance, where the image capture device comprises an external camera, image capture module 330 might include a camera interface circuit adapted to connect to the external camera and to receive specific signals from the camera. In such cases, the signals from the camera may contain raw image data in RGB, YCbCr, or YUV format.

Where the image capture device comprises an external camera, the camera may include any one of a number of possible imaging technologies, including as examples, a complementary metal oxide semiconductor (CMOS) image sensor or a charged couple device (CCD) image sensor. In addition, the image capture device may provide an image signal processor (ISP) for discretizing, subsampling, filtering, or otherwise processing image data before transferring it to image capture module 330.

Subsequent to receiving the image data, image capture module 330 may transfer the image data to another module for further processing. For example, the image data may be transferred to main memory 392 so that it can be digitally scaled, rotated, subsampled, filtered, etc.

Once the image data has been processed, (e.g., transformed, compressed, etc.), it is either stored in the high density main memory 392 or output to the system display using display control module 370. Display control module 370 interfaces with and/or controls one or more system display(s), which may take many forms including a liquid crystal display (LCD), a cathode ray tube (CRT), a printer, etc.

The dual layer bus architecture shown in FIG. 4 provides several benefits to multimedia enabled devices. For instance, secondary memory 324 connected to dual master module 300 allows moving image compression module 340 and still image compression module 350 to efficiently read/write data without having to contend for resources associated with main bus 312, and without having to wait on the typically slower access speed of main memory 392. As a result, main bus 312 is less likely to be overwhelmed by excessive bandwidth demands associated with the bandwidth intense data transfers that characterize image compression techniques. Additionally, the encoding and decoding processes associated with the compression/de-compression of image data may be dramatically accelerated.

Figure 5:
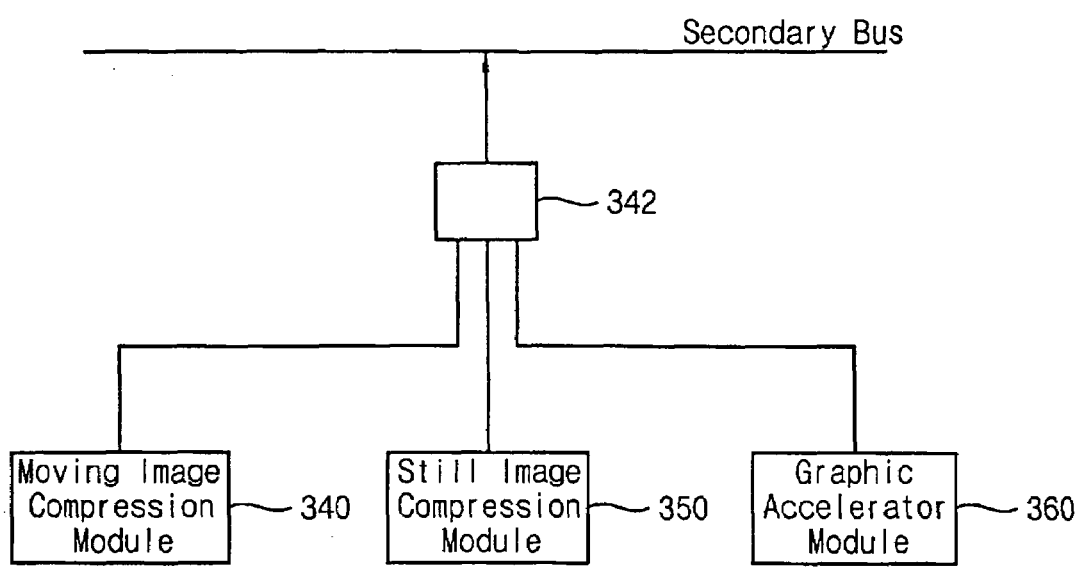
FIG. 5 is a block diagram illustrating a bus arbitration module according to one embodiment of the invention.

Referring now to FIG. 5, access to secondary memory 324 may be controlled by a secondary bus arbitration mechanism connected to secondary bus 322. FIG. 5 is a block diagram illustrating a secondary bus arbitration mechanism having the form of a multiplexing logic circuit 342. Those of ordinary skill in the art will recognize that many specific circuit designs are possible in the implementation of multiplexing logic circuit 342, so long as the circuit ensures that at most one module from dual master module 300 accesses secondary bus 322 at any given point in time. Alternatively, a conventionally provided secondary bus arbiter 394, similar in form and operation to main bus arbiter 314 may be provided. (See, FIG. 6).

However, in FIG. 5, multiplexing logic circuit 342 receives data output by moving image compression module 340, still image compression module 350, and graphics acceleration module 360, and applies the data received from at most one of these modules to secondary bus 322. Multiplexing logic circuit 342 may allocate bandwidth for each of the multiplexed modules in dual master module 300 in response to external and/or internal control signals. For example, internal control signals might be generated by a bandwidth scheduler incorporated within multiplexing logic circuit 342. Alternatively, external control signals might generated by microprocessor 310 or image capture module 330.

Figure 6:
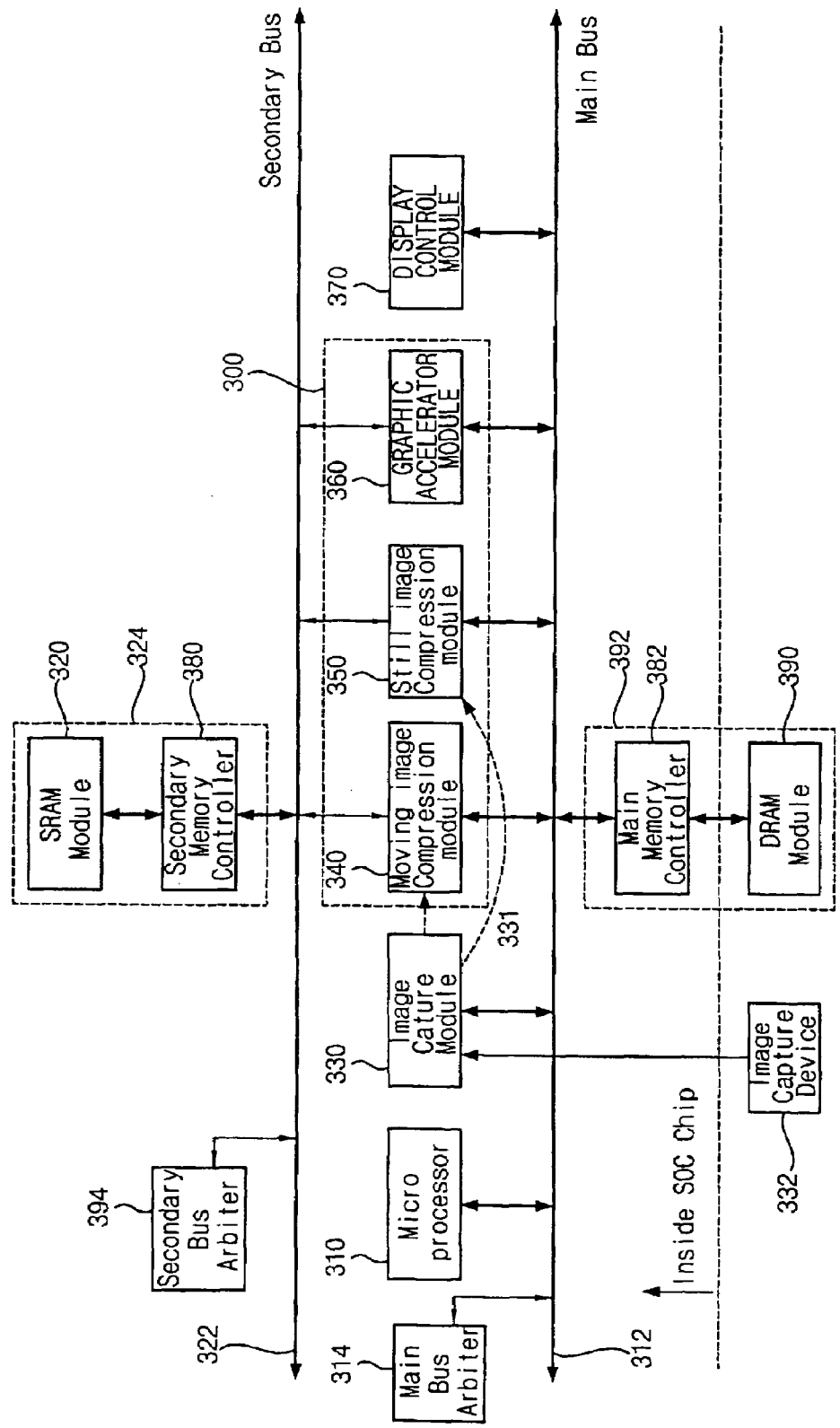
FIG. 6 is a block diagram illustrating a SOC bus architecture according to another embodiment of the present invention.

FIG. 6 is a block diagram illustrating a SOC bus architecture according to another embodiment of the present invention. The SOC bus architecture shown in FIG. 6 is the same as that shown in FIG. 4, except that in FIG. 6, a second bus arbiter circuit 394 is used to control access to the secondary memory, instead of multiplexing logic circuit 342.

Using conventional techniques, secondary bus arbiter circuit 394 controls access to secondary memory 324 by controlling access to and use of secondary bus 322 by the modules in dual master module 300. In order to be granted access to secondary bus 322, a module within dual master module 300 must first typically generate an access request signal. Second bus arbiter circuit 394 then responds to the access request signal by generating an access granted response signal. Upon receiving an access granted response signal, the requesting module initiates data transfer on secondary bus 322 using a set of predetermined operations.

Figure 7:
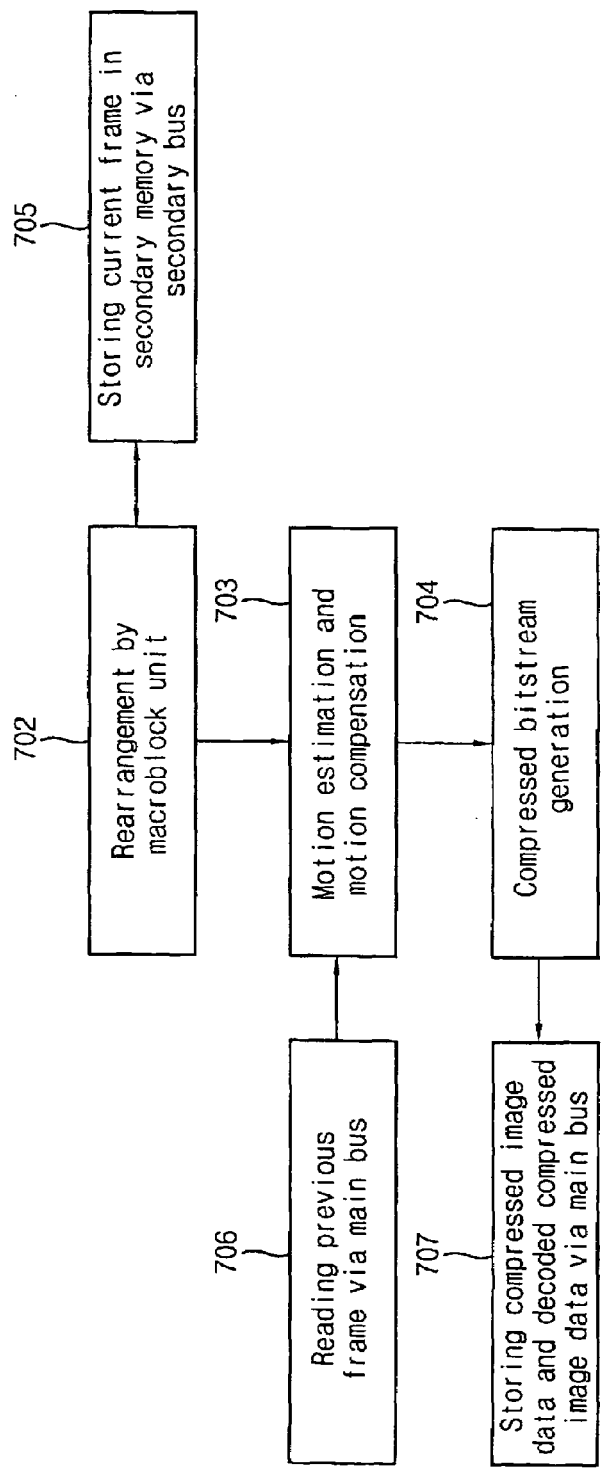
FIG. 7 is a flow chart illustrating a method of using a SOC to perform MPEG encoding according to one embodiment of the invention.
Figure 8:
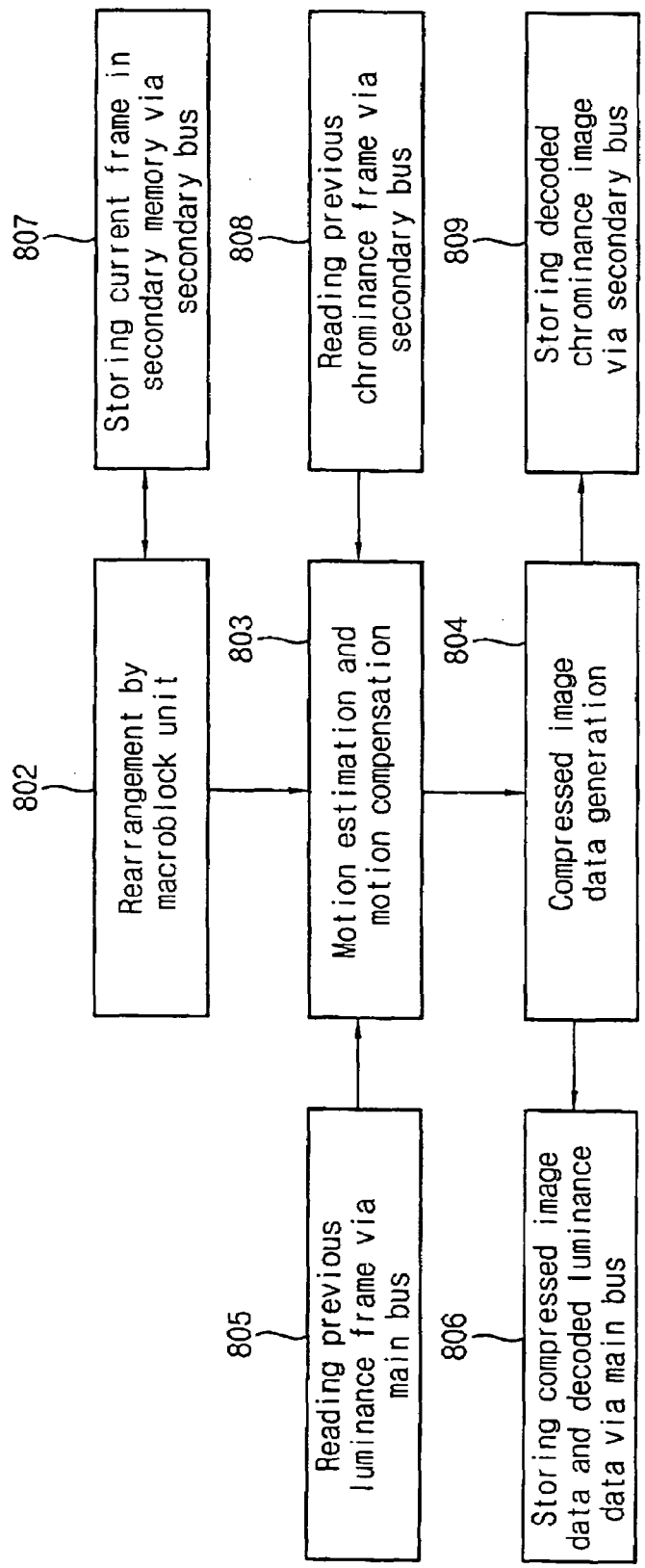
FIG. 8 is a flow chart illustrating a method of using a SOC to perform MPEG encoding according to another embodiment of the invention.
Figure 9:
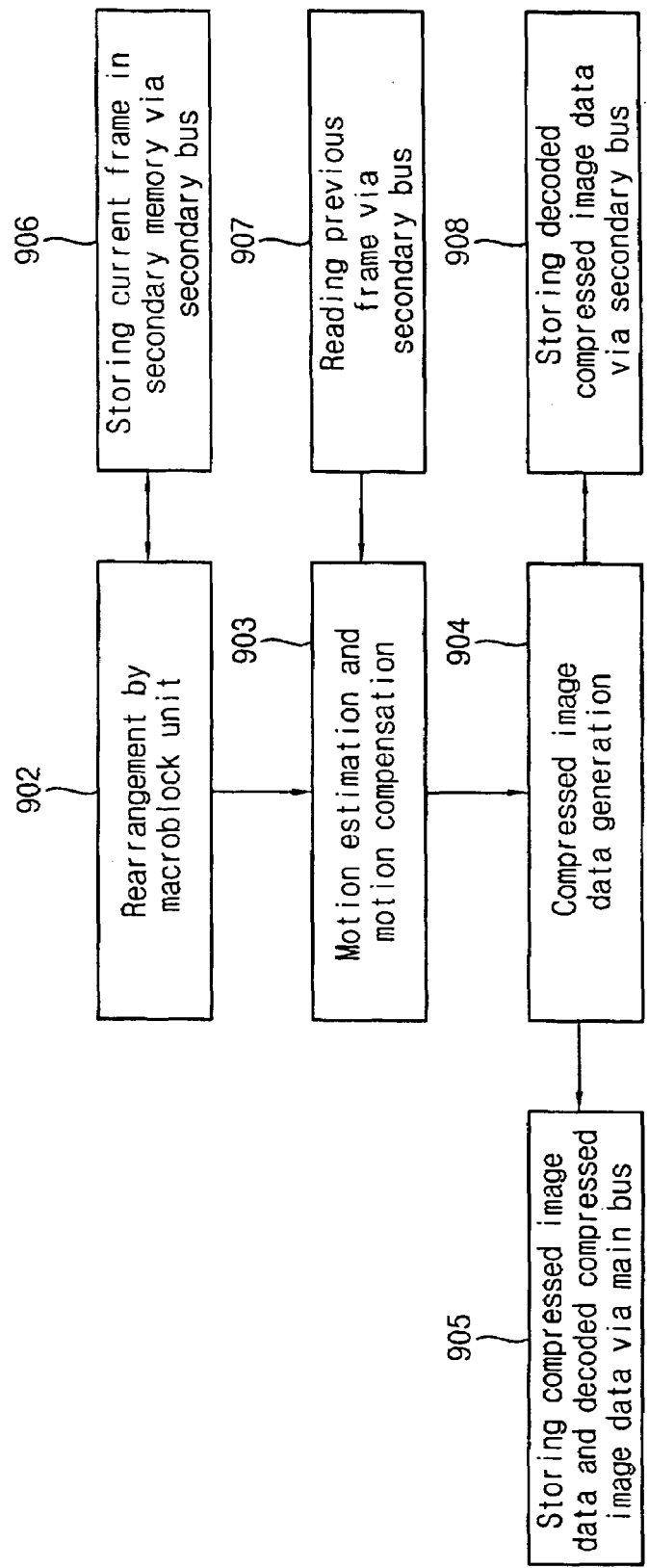
FIG. 9 is a flow chart illustrating a method of using a SOC to perform MPEG encoding according to still another embodiment of the invention.
Figure 10:
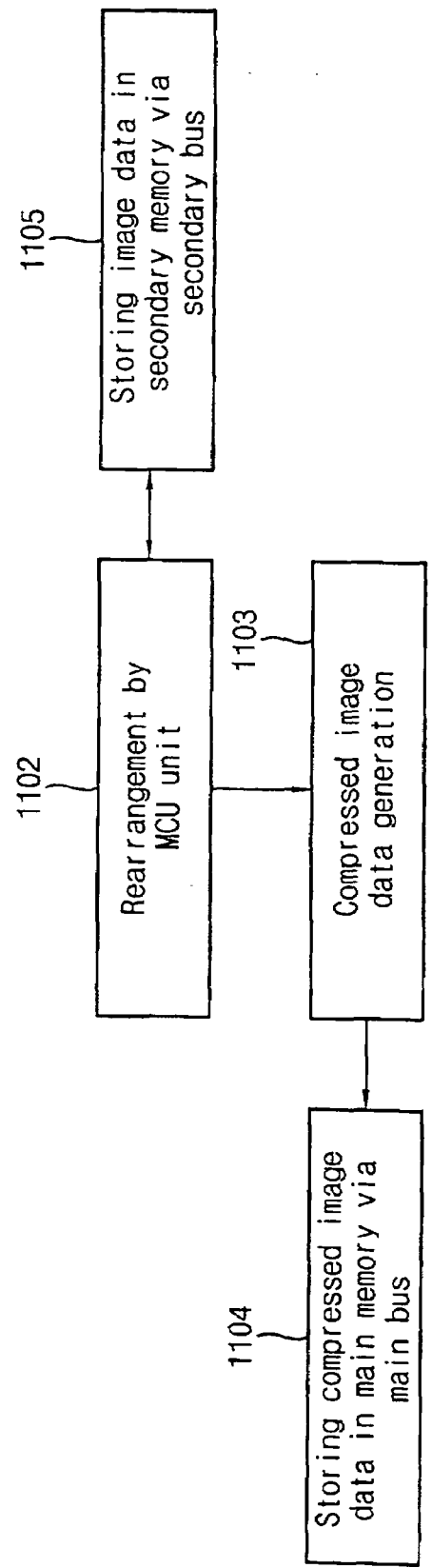
FIG. 10 is a flow chart illustrating a method of using a SOC to perform JPEG (Joint Photographers Expert Group) encoding according to an embodiment of the present invention; and, FIG. 11 is a flowchart illustrating another method for use with a SOC bus architecture like those shown in FIGS. 4 and 6.

FIGS. 7 through 10 are flow charts illustrating exemplary methods adapted for use in a dual layer SOC bus architecture. In this written description, exemplary method steps are designated by parentheses such as (000) to distinguish them from exemplary system elements (shown without parentheses), like those in FIGS. 4 through 6. In particular, FIGS. 7 through 9 illustrate exemplary methods adapted for use in dual layer SOC bus architectures like those shown in FIGS. 4 and 6. For purposes of contextual explanation, the exemplary systems are assumed to be using a MPEG-related encoding scheme. FIG. 10 illustrates yet another exemplary method adapted for use in dual layer SOC bus architectures like those shown in FIGS. 4 and 6. Again for purposes of illustration within a meaningful contemporary context, the exemplary systems are assumed to be using a JPEG-related encoding scheme.

The methods described in relation to FIGS. 7 through 9 are drawn to exemplary systems having a range of secondary memory sizes. That is, the invention recognizes that practical constraints associated with a product incorporating a SOC designed in accordance with the invention may dictate the size of an associated secondary memory. Newer, expensive products may have the luxury of incorporating a relatively large secondary memory. Products constrained by size, cost, or backwards compatibility may include only a relatively small secondary memory. As will be seen from the following, the benefits of the invention are applicable to a range of product types and a range of products having different capabilities, such as secondary memory size.

For example, the method illustrated in relation to FIG. 7 is particularly well suited for use within systems comprising a secondary memory 324 having a relatively small storage capacity. In such cases, secondary memory 324 is used to temporarily store, for example, a plurality of macroblocks of current image data being used in an ongoing MPEG encoding operation. In the description that follows, the terms "current" and "previous" have temporal reference to a sequence of frames like those described above in relation to MPEG encoding/decoding operations. These are, however, merely convenient descriptive examples. The terms "current frame (or data)" and "previous frame (or data)" might in the context of a non-MPEG based descriptive example be broadly interpreted as "one data set" and "another temporally related data set," respectively.

Referring now to FIGS. 4, 6, and 7, moving image compression module 340 receives raster-scan ordered current image data corresponding to a current frame in an input video sequence. The term "raster-scan ordered" has obvious reference to the sequence of video image data provided by conventional MPEG-compliant image capture modules and related image capture devices. More generally, this term along with the term "raw image data" describe any ordered sequence of video data arising from any larger set of image data adapted to visual display. In the illustrated embodiments, raster-scan ordered current image data is typically received in moving data compression module 340 from image capture module 330 via directly connected image data bus 331.

The raster-scan ordered current image data is rearranged into a plurality of macroblocks (702), which are stored (705) in secondary memory 324 via the secondary bus 322. The plurality of macroblocks are transferred to moving image compression module 340 via secondary bus 322, and previous image data corresponding to a previous frame in the input video sequence is transferred (706) to moving image compression module 340 from main memory 392 via main memory bus 312.

Motion estimation (703) is performed on each macroblock using the previous image data, thereby generating a plurality of motion vectors corresponding to the plurality of macroblocks. Moving image compression module 340 then generates compressed image data (704) from the plurality of macroblocks and the previous image data. A motion compensation error block is generated for each macroblock based on the motion vectors and the compressed image data. The compressed image data and a decoded version of the compressed image data are then stored (707) in main memory 392 via main bus 312.

Motion compensation (703) is performed in subsequent decoding operations by adding the motion compensation blocks to corresponding macroblock approximations generated by applying the motion vectors to the previous image data.

The previous image data is generally transferred to moving image compression module 340 from main memory 392 in a decoded form. This allows moving image compression module 340 to perform motion estimation without first decoding the previous image data.

FIG. 8 illustrates another exemplary method adapted for use in SOCs comprising a secondary memory 324 having a medium sized storage capacity. In systems having a secondary memory larger than the example described above, secondary memory 324 may be used to store not only current frame data, but also a chrominance portion of one or more previous frames to-be-used during the MPEG encoding process.

Referring to FIG. 8, raster-scan ordered current image data corresponding to a current frame is received by moving image compression module 340. The current image data is then rearranged into a plurality of macroblocks (802) and stored (807) in secondary memory 324 using secondary bus 322. A decoded version of the luminance portion of previous image data corresponding to a previous frame is then read (805) from main memory 392 via main bus 312 to moving image compression module 340. However, a decoded version of the chrominance portion of the previous image data is read (808) from secondary memory 324 via secondary bus 322 to moving image compression module 340.

The plurality of macroblocks are also read from secondary memory 324 to moving image compression module 340 via secondary bus 322. Motion estimation and motion compensation (803) are then performed using the macroblocks and the chrominance and luminance portions of the previous image data. That is, moving image compression module 340 generates compressed image data (804) from the plurality of macroblocks and the respective components of the previous image data. The compressed image data and a decoded version of a luminance portion of the compressed image data are written to (806) main memory 324 via main bus 312, but a decoded version of a chrominance portion of the compressed image data is written to (809) secondary memory 324 via secondary bus 322.

FIG. 9 illustrates yet another exemplary adapted for use in systems wherein secondary memory 324 has a considerably larger storage capacity. In such systems, moving image compression module 340 uses secondary memory 324 to store both current frame and previous frame data to-be-used during MPEG encoding and/or decoding processes.

Referring to FIG. 9, raster-scan ordered current image data corresponding to a current frame is received by moving image compression module 340. The current image data is rearranged into a plurality of macroblocks (902) and stored (906) in secondary memory 324. A decoded version of the previous image data corresponding to a previous frame is read from (907) the secondary memory 324 via secondary bus 322 to moving image compression module 340, and the plurality of macroblocks are also read from secondary memory 324 to moving image compression module 340 via secondary bus 322. Motion estimation and motion compensation (903) are then performed using the macroblocks as well as luminance and chrominance portions of the previous image data. The moving image compression module 340 generates compressed image data (904) from the plurality of macroblocks and the previous image data. The compressed image data is written to (905) main memory 392 via main bus 312. A decoded version of the compressed image data is written to (908) to secondary memory 324 via secondary bus 322.

In the method described in relation to FIG. 9, the previous image data read from and written to secondary memory 324 comprises both luminance and chrominance portions of the corresponding previous frame. Similarly, the current image data and the corresponding compressed image data also contain both luminance and chrominance portions.

FIG. 10 illustrates an exemplary method adapted for use in a SOC bus architectures like those shown in FIGS. 4 and 6 and further adapted to perform JPEG encoding.

Referring to FIG. 10, raster-scan ordered image data is received by still image compression module 350. The image data is typically received from image capture module 330, which is generally connected to an external camera (not shown). The image data is stored (1005) in secondary memory 324 via secondary bus 322. Still image compression module 350 rearranges the current image data into a plurality of minimum coded units (MCUs) (1002). Typically, each MCU comprises an 8×8 block of pixels in a format such as RGB or YUV. Compressed image data is then generated from the plurality of MCUs (1003) using a standard JPEG coding algorithm. The JPEG coding algorithm typically includes performing DCT, quantization, and VLC on each MCU. The compressed image data is then stored (1004) in main memory 392 via main bus 312. In general, the MCUs are compressed sequentially. In other words, the MCUs are read from secondary memory 324 to still image compression module 350 and compressed in some type of sequential order.

Figure 11:
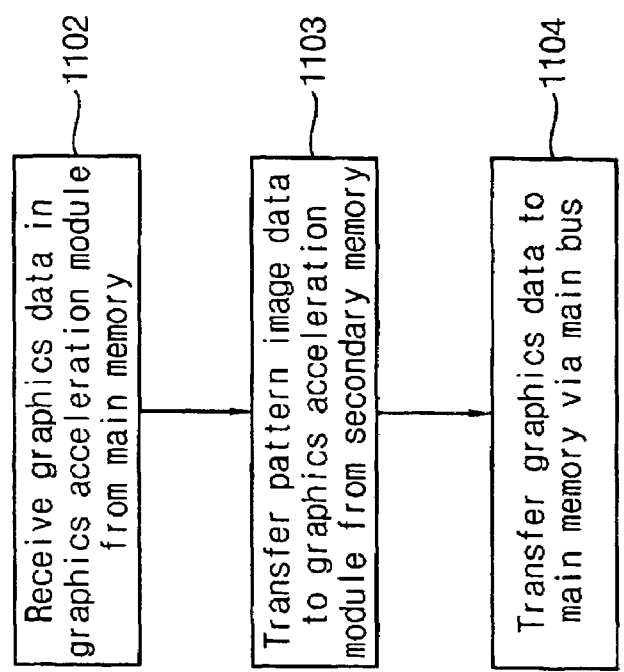

FIG. 11 is a flow chart illustrating yet another exemplary method adapted for use in a SOC bus architectures like those shown in FIGS. 4 and 6 and further adapted to perform conventional graphics processing.

Referring to FIG. 11, graphics data is first received (1102) in graphics acceleration module 360 from main memory 392 from main bus 312. Some portion of the graphics data, whether first modified by graphics acceleration module 360 or not, is then written to (1103) secondary memory 324 via secondary bus 322. Secondary memory 324 is used in accordance with conventionally understood techniques to form pattern image data from the graphics data. Pattern image data is graphics data adapted for display on a LCD or similar display associated with the system. For example, the pattern image data may define a texture map or an array of polygons (e.g., triangles) to be graphically rendered on the display under the control of display control module 370. Once the graphics data is modified by graphics acceleration module 360 using secondary memory 324, the modified graphics data, including pattern image data, may be written to (1104) main memory 392 via the main bus 312.

The foregoing examples are described in the context of several exemplary systems having dual layer bus architectures. The examples contain only two bus layers, but might easily contain more than two buses. Further, dual master module 300 is shown connected to the secondary and main buses of the illustrated examples, but it might easily be connected to additional bus structures. In this regard, dual master module 300 is illustrated in the foregoing examples as comprising a moving image compression module, a still image compression module and a graphics acceleration module. Those of ordinary skill in the art will understand that only one or more of such modules may be present in other embodiments of the invention. Further, these modules may be aggregated into a one or more integrated circuits.

These modifications are just a few of the many possible modifications suggested by the foregoing examples and residing within the scope of the invention. Similarly, the specific MPEG and JPEG related method steps described above teach a more general application of the invention within the context of any reasonable video data compression procedure, whether standardized or proprietary. That is, the moving image compression module may be a MPEG-compliant module and/or may generically comprise one or more modules adapted to receive raw image data in RGB, YCbCr or YUV format. Likewise, the still image compression module may be a JPEG-compliant module and/or may generically comprise one or more modules adapted to receive raw image data in RGB, YCbCr or YUV format.

Thus, the invention is not limited to only the exemplary embodiments described above or the teaching context (e.g., MPEG and JPEG) of the examples. Rather, the scope of the invention is bounded by the claims that follow.

What is claimed:

1. A SOC bus architecture, comprising:
   a main bus adapted to connect a microprocessor, an image capture module, and a dual master module to a high density main memory; and
   a high-speed secondary bus operating independently from the main bus and adapted to connect the dual master module to a high-speed secondary memory.

2. The SOC bus architecture of claim 1, wherein the dual master module comprises at least one of a moving image compression module, a still image compression module, and a graphics acceleration module.

3. The SOC bus architecture of claim 2, wherein the moving image compression module comprises a module adapted to receive raw image data in RGB, YCbCr or YUV format; and,
wherein the still image compression module comprises a module adapted to receive raw image data in RGB, YCbCr or YUV format.

4. The architecture of claim 2, further comprising:
a secondary bus arbitration module controlling access to the secondary memory.

5. The architecture of claim 4, wherein the secondary bus arbitration module comprises a bus arbiter circuit or a multiplexing logic circuit.

6. The architecture of claim 2, further comprising:
an image data bus directly connecting the image capture module and the moving image compression module.

7. The architecture of claim 6, wherein the image capture module comprises a camera interface circuit adapted to connect an external camera.

8. The architecture of claim 7, wherein the external camera provides image data compatible with raw image data in RGB, YCbCr or YUV format.

9. The architecture of claim 1, further comprising:
a main bus arbiter circuit controlling access to the main memory.

10. The architecture of claim 9, wherein the main memory comprises a main memory controller controlling one or more DRAM modules; and,
wherein the secondary memory comprises a secondary memory controller controlling one or more SRAM modules.

11. The architecture of claim 1, further comprising a display control module connected to the main bus.

* * * * *